(12) United States Patent
Denavit et al.

(10) Patent No.: US 9,511,556 B2
(45) Date of Patent: Dec. 6, 2016

(54) VARIABLE-DIAMETER MIXED ASSEMBLY DRUM FOR MANUFACTURING A TIRE COMPRISING BLOCKABLE GROOVES

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Franck Denavit, Clermont-Ferrand (FR); Stephane Ravat, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 256 days.

(21) Appl. No.: 14/361,432

(22) PCT Filed: Nov. 28, 2012

(86) PCT No.: PCT/EP2012/073857
§ 371 (c)(1),
(2) Date: May 29, 2014

(87) PCT Pub. No.: WO2013/079544
PCT Pub. Date: Jun. 6, 2013

(65) Prior Publication Data
US 2015/0000845 A1    Jan. 1, 2015

(30) Foreign Application Priority Data

Nov. 30, 2011 (FR) ...................... 11 60966

(51) Int. Cl.
B29D 30/26  (2006.01)
B29D 30/24  (2006.01)
B29D 30/20  (2006.01)

(52) U.S. Cl.
CPC ............. B29D 30/244 (2013.01); B29D 30/20 (2013.01); B29D 30/26 (2013.01);
(Continued)

(58) Field of Classification Search
CPC ................ B29D 30/24; B29D 30/244–30/247; B29D 30/26; B29D 2030/201; B29D 2030/3214; B29D 2030/265
See application file for complete search history.

(56) References Cited

U.S. PATENT DOCUMENTS 4,229,246 A    10/1980  Vanderzee
7,866,359 B2 *  1/2011  de Laubier .......... B29D 30/246
                                                                  156/117

(Continued)

FOREIGN PATENT DOCUMENTS

EP       0634266 A2       1/1995
EP       1847380          10/2007
WO   WO-2012/085713 A1 *  6/2012  ........... B29D 30/247

OTHER PUBLICATIONS

International Search Report for PCT/EP2012/073857 dated Feb. 13, 2013.

*Primary Examiner* — Geoffrey L Knable
(74) *Attorney, Agent, or Firm* — Dickinson Wright PLLC

(57) ABSTRACT

Variable-diameter tire-building drum intended for the manufacture of a green tire having a generally cylindrical receiving surface formed of radially mobile sectors and bearing elements the radially external part of which constitutes the receiving surface, the receiving surface comprising at least one circular groove containing an elastic circumferential sleeve which is held radially away from the bottom of the (Continued)

groove by pushers able to move radially with respect to the mobile sectors so as to align the radially external surface of the sleeve with the receiving surface when the drum is brought to a first laying diameter, and which is pressed against the bottom of the groove under the effect of circumferential elastic tensions when the drum is placed at a laying diameter greater than the said first laying diameter. Disengageable locks are able to keep the pushers in the position in which the radially external surface of the sleeve is aligned with the receiving surface regardless of the diameter to which the said receiving surface is brought.

9 Claims, 3 Drawing Sheets

(52) U.S. Cl.
CPC .. *B29D 2030/201* (2013.01); *B29D 2030/265* (2013.01); *B29D 2030/2614* (2013.01)

(56) References Cited

U.S. PATENT DOCUMENTS

| | | | |
|---|---|---|---|
| 2003/0168144 A1* | 9/2003 | Weaver | B29D 30/36 152/415 |
| 2004/0194892 A1 | 10/2004 | Currie | |

* cited by examiner

X - - - - - - - - - - - - - - - - - - - - - - - - X'

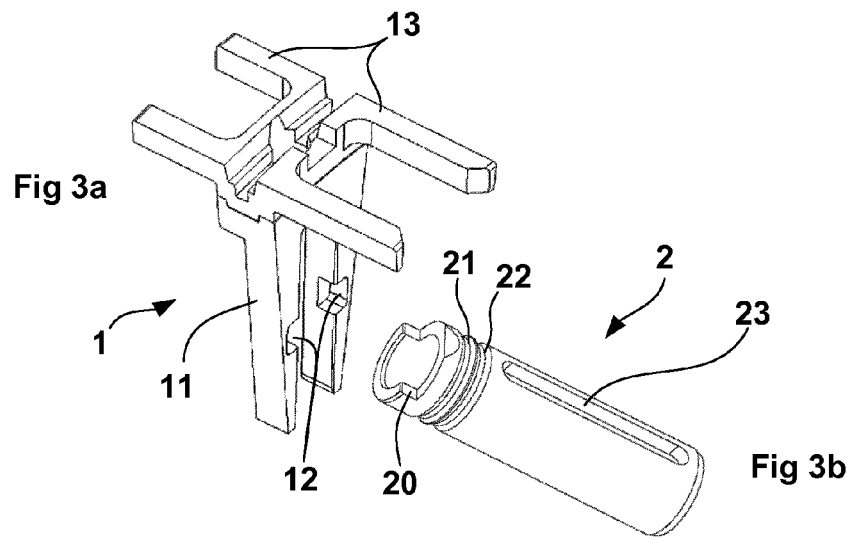
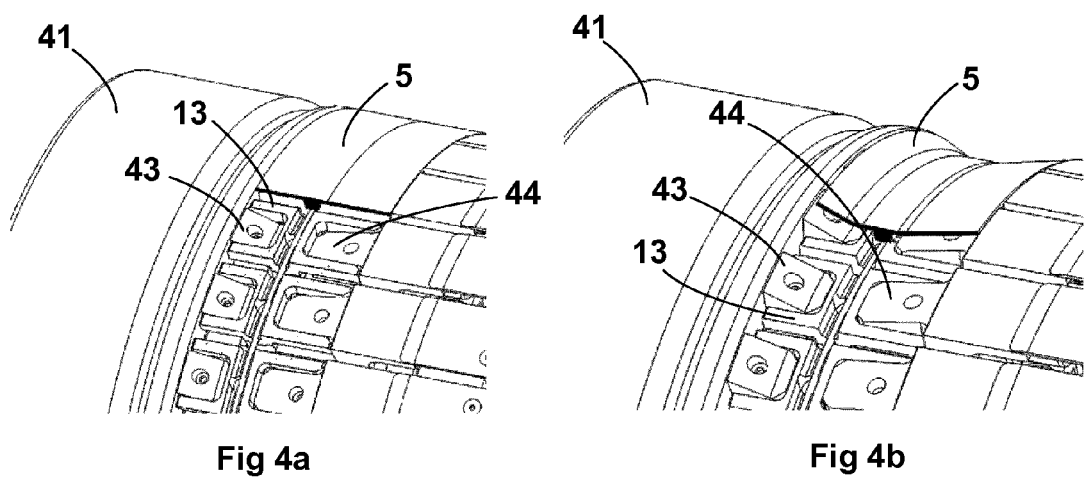

VARIABLE-DIAMETER MIXED ASSEMBLY DRUM FOR MANUFACTURING A TIRE COMPRISING BLOCKABLE GROOVES

This application is a 371 national phase entry of PCT/EP2012/073857, filed 28 Nov. 2012, which claims benefit of FR 1160966, filed 30 Nov. 2011, the entire contents of which is incorporated by reference herein for all purposes.

BACKGROUND

1. Field

The disclosure relates to the field of tire manufacture and more particularly to tire building drums for assembling what are referred to as self-supporting run-flat tires.

2. Description of Related Art

The building of these tires is characterized by the fact that they comprise thick rubber profiled elements arranged in the sidewalls and generally positioned between the innerliner and the carcass reinforcing ply or plies. The purpose of these products is to withstand the load when the air pressure in the tire cover is no longer able to perform this role.

Because of this arrangement, the building of this type of tire requires special precautions to ensure a correct junction between the profiled elements and to avoid trapping air between the said profile elements, particularly when use is being made of a cylindrical drum.

This is because when laying thick profiled elements at the axial location corresponding to the sidewall region it is found that the meridian profile acting as a receiving surface for the carcass reinforcing ply is relatively uneven. This has the effect of encouraging air to become trapped between the carcass reinforcing ply and the profiled elements situated radially underneath.

Publications EP 634 266 or alternatively EP 1 847 380 disclose solutions able to solve the stated problem and described tire-building drums comprising grooves arranged on the receiving surface of the drum and axially spaced so that they can be positioned more or less in line with the zone in which the thick profiled elements are laid. In this way, by suitably determining the shape of the groove it becomes possible, after the laying of the thick profiled elements, to obtain a carcass reinforcing ply receiving surface that is substantially cylindrical. The thick profiled element hugs the profile of the said groove in such a way that its radially external surface is substantially aligned with the generally cylindrical exterior surface of the tire-building drum. The carcass reinforcing ply is laid on a cylindrical surface that is free of zones liable to trap air.

The next profiled elements are generally laid after the drum has been brought to a second laying diameter. Steps are then taken to ensure that, at the end of this first shaping, and, moreover, of the subsequent shapings, the radially external surface of the thick profiled element remains aligned with the receiving surface of the drum.

More specifically, publication EP 1 847 380 describes a drum in which, when the drum is brought to a first laying diameter, a mechanical means keeps an elastic body away from the bottom of the groove so as to align the radially external surface of the elastic body with the receiving surface of the tire-building drum.

When the drum is brought to a second laying diameter greater than the first laying diameter and the elastic body is pressed firmly against the bottom of the groove, the radially external surface of the thick profiled element forms, with the surface of the drum, a surface that is generally cylindrical.

This type of tire-building drum therefore addresses the problem of the laying of the thick profiled elements used for the manufacture of what are known as self-supporting run-flat tires entirely satisfactorily.

SUMMARY

However, it is found that the tire-building drums needed for manufacturing one size of self-supporting run-flat tire differ from the drums used for the manufacture of conventional, non-self-supporting tires only through the presence of the abovementioned groove.

It may therefore prove beneficial to offer a mixed tire-building drum that can be used just as easily, according to manufacturing needs, for creating self-supporting run-flat tires or non-self-supporting tires of the same or similar dimensions.

It is an object of embodiments of the invention to propose a solution to this problem and the invention therefore represents an improvement to the drum described in publication EP 1 847 380.

The tire-building drum according to embodiments of the invention is a variable-diameter drum intended for the manufacture of a green tire. This drum has a generally cylindrical receiving surface formed of radially mobile sectors and bearing elements the radially external part of which constitutes the receiving surface, the receiving surface comprising at least one circular groove containing an elastic circumferential sleeve which is held radially away from the bottom of the groove by pushers able to move radially with respect to the mobile sectors so as to align the radially external surface of the sleeve with the receiving surface when the drum is brought to a first laying diameter, and which is pressed against the bottom of the groove under the effect of circumferential elastic tensions when the drum is placed at a laying diameter greater than the said first laying diameter. This drum is characterized in that disengageable locks are able to keep the pushers in the position in which the radially external surface of the sleeve is aligned with the receiving surface regardless of the diameter to which the said receiving surface is brought.

In that way, when the locks are released in the open position, the elastic sleeve, under the action of the pushers, will position itself level with the receiving surface for only the position corresponding to the first diameter of the drum and will hug the bottom of the groove for larger diameters, allowing the manufacture of tires referred to as self-support run-flat tires comprising thick profiled elements. Further, in the closed or locked position, the sleeves remain level with the receiving surface whatever the diameter, allowing the manufacture of standard tires that do not comprise the said profiled elements. The same drum is therefore suited to both uses.

Advantageously, the tire-building drum may comprise two grooves arranged axially one on each side of the meridian of the drum, so as to house the thick profiled elements intended to support each of the two sidewalls of the tire.

In a position referred to as the closed position, the disengageable locks prevent the pushers from moving radially relative to the mobile sectors on which the said pushers are mounted, and in a position referred to as the open position, the locks allow the pushers to slide radially relative to the mobile sectors on which the said pushers are mounted.

Depending on the type of construction of the tire-building drum, it may prove advantageous to design a pusher comprising a rod sliding radially with respect to the mobile sector on which the said pusher is mounted, and of which the length in the radial direction is adjusted so that when the drum is brought to its first laying diameter, a first end of the rod comes into abutment against a cylindrical surface of constant diameter and the other end pushes back the elastic sleeve so that the radially external surface of the said sleeve is at the same diameter as the laying diameter of the drum.

In order to improve the radial resistance of the laying surface in the region of the elastic sleeves, it may prove advantageous to provide, in the part of the pusher that supports the elastic sleeve, axial projections able to support the elastic sleeve. These axial projections usefully have an axial length substantially equal to the width of the groove.

Still depending on the type of construction of the tire-building drum, the lock axially enters a housing formed on the rod of the pusher so as to hold the said pusher in the closed position.

When the tire-building drum is of the type comprising a mechanism able to alter the axial position of the mobile sectors between two extreme positions, it may prove judicious to contrive for the mobile sectors reaching their end stops in each of the extreme axial positions to cause the locks to open or close respectively.

Finally, it may be beneficial to provide a ball-ended pusher, mounted in each of the mobile sectors, able to keep the lock mounted on the said sector in the open or closed position so as to prevent the said lock from moving axially relative to the rod of the pusher when the mobile sectors are moving radially or axially.

BRIEF DESCRIPTION OF DRAWINGS

The following description provides illustration of the invention by reference to, one embodiment of the invention and comprises FIGS. 1 to 5 in which:

FIGS. 3a and 3b depict perspective views of the lock and of the rods of the pusher, FIGS. 4a and 4b depict the views in cutaway of the elastic sleeve in its two positions.

DETAILED DESCRIPTION OF SPECIFIC EMBODIMENTS

Figure 1:
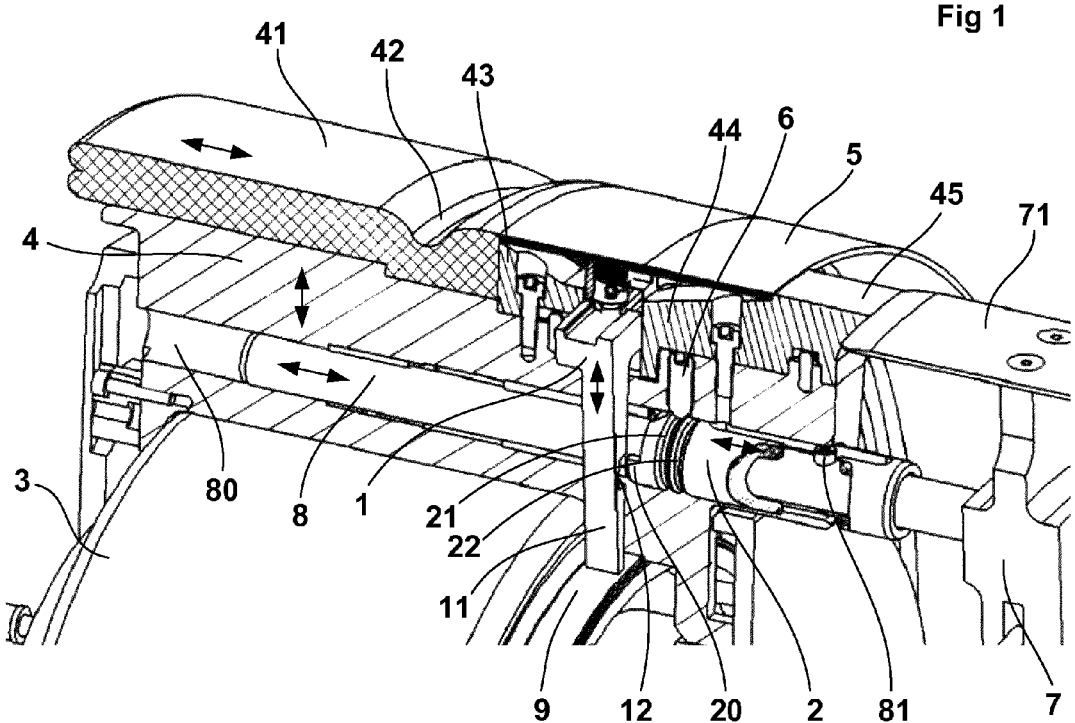
FIG. 1 depicts a view with cutaway of a half-sector of a drum according to the invention.
Figure 2:
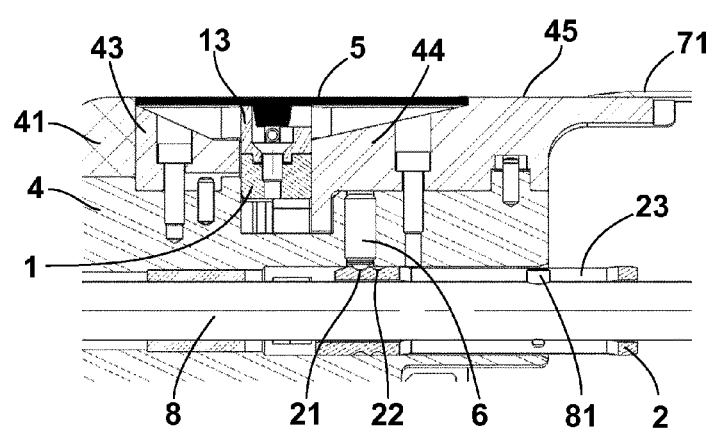
FIG. 2 depicts a view in cross section of that same part of the drum.

The tire-building drum depicted in FIG. 1 comprises a first set of cylindrical sectors 4, able to move radially under the action of an annular bladder 3 and distributed circumferentially about a motor axis (not depicted). An identical second set of mobile sectors (which are not depicted) which are symmetric with the sector 4 illustrated in FIG. 1 about a meridian plane, are also distributed circumferentially about the motor axis. These two subsets of mobile sectors constitute all of the mobile sectors of the tire-building drum.

Each pair of mobile sectors, which is made up of the two mobile sectors which are symmetric about the meridian plane, supports a central part 7 via a spindle 8 running freely in an axial duct 80 made in each of the mobile sectors 4.

These mobile sectors 4 and the central part 7 support elements 41, 42, 5, 45, 7 of which the external radial part forms the receiving surface of generally cylindrical shape.

If the motor shaft is set in rotation it causes the receiving surface to begin to rotate about an axis that coincides with the axis of the bearing shaft.

Radial expansion of the annular bladders 3 causes all of the mobile sectors to rise in the radial direction and an increase in the diameter of the receiving surface from a first laying diameter corresponding, as a general rule, to the diameter for the laying of the carcass reinforcing ply, to a second or even a third laying diameter corresponding to the diameter for laying the profiled elements such as the sidewall profiled elements or the profiled elements that support the crown reinforcing plies.

In the case of the example used to illustrate the present description, the mobile sectors support an annular turnover membrane 41 comprising a cylindrical groove 42 intended to receive and keep in position the annular rings that reinforce the beads of the tire during the process of tire building. The central part supports a shoe 71, generally rigid and of cylindrical shape. The radially external face of the set of shoes 71 forms the central part of the receiving surface.

An elastic sleeve 5 is positioned between the groove that receives the bead reinforcing rings 42 and the central part 71. The elastic sleeve 5 has a circumferential tension suited to allowing it to hug the shape of a circumferential groove, the shape of which is conferred upon it by the radially external faces of the elements 43 and 44 fixed to the mobile sectors 4.

Each mobile sector 4 comprises a pusher 1, able to move radially relative to the said sector, and positioned between the elements 43 and 44 on which the radially internal central part of the elastic sleeve 5 rests. A rod 11 extends the pusher in the radially internal direction and bears against a cylindrical surface 9, borne by the motor spindle, and of constant diameter.

The radial length of the rod 11 is adjusted so that when the receiving surface is positioned at its smallest diameter the rod bears against the surface 9 and lifts the elastic sleeve in the radially external direction so that the radially exterior surface of the sleeve 5 lies at substantially the same diameter as the receiving surface.

When the drum is brought to a larger diameter, the rod separates from the surface 9 and the pusher 1 is pushed radially into the bottom of the gap formed by the elements 43 and 44 under the effect of the internal elastic forces within the elastic sleeve 5. This results in the appearance of a circular groove positioned between the groove that receives the bead reinforcing ring and the central part, intended to receive the thick profiled elements used in the building of tires referred to as self-supporting run-flat tires.

Such principles are also described in publication EP 1 847 380.

The subject matter of the present invention does, however, differ therefrom in that a lock 2 collaborates with the rod 11 of the pusher 1 so as to block or free the axial movement of the pusher relative to the mobile sector 4 on which the said pusher is mounted. The lock 2 is mounted with sliding in the axial direction along the spindle 8. With reference to FIGS. 3a and 3b, one of the axial ends 20 of the lock, acting like a lock bolt, can enter a housing 12 made in the rod 11 and the function of which is similar to that of a keeper.

When the lock is placed in the closed position, i.e. when the end 20 enters the housing 12, the pusher 1 is immobilized in terms of radial translation relative to the mobile sector 4, and when the end 20 is withdrawn from the housing 12, the pusher 21 regains its radial mobility.

Steps are therefore taken to ensure that the housing 12 is positioned a suitable axial distance away so that when the lock 2 is engaged in the housing 12 in the rod 11 the pusher 1 brings the radially external surface of the elastic sleeve 5 to the same diameter as the receiving surface of the drum. The result of this is that raising the laying surface to diameters greater than the first laying diameter will not have the effect of bringing the elastic sleeve back into the bottom of the groove and that the radially external surface of this sleeve will remain aligned with the receiving surface, whatever the diameter to which the tire-building drum is brought.

The drum can therefore be used for assembling standard tires that contain no thick products arranged radially under the carcass reinforcing ply.

FIGS. 4a and 4b provide a visual reference for the sleeve 5 in its two positions. FIG. 4a depicts the sleeve aligned with the, generally cylindrical, receiving surface of the tire-building drum, and FIG. 4b depicts the sleeve resting on the bottom of the circumferential groove formed by the set of elements 43 and 44 placed on each of the mobile sectors 4.

To improve the rigidity of the portion of receiving surface formed by the sleeve, it is possible to arrange at the radially external end of the pusher rigid axial extensions that extend over all or part of the groove formed by the elements 43 and 44. In that way, when the tire-building drum is used for the manufacture of standard tires, the radial loads generated by the elastic tension of the profiled elements and the rollering of the profiled elements during the course of tire building are better contained and do not cause geometric modifications to the laying surface in line with the elastic sleeve 5.

Another refinement is to put to use the special kinematics of certain tire-building drums that have the feature of comprising means (46) able to vary the axial position of the sets formed of the mobile elements 4 and of the bladders 3, the central part remaining in a fixed axial position. These means make it possible to vary the distance between the grooves 42 intended to receive the bead reinforcing rings and allow the building of tires of the same diameter but different constructions.

Use is made of the options offered by this mechanism to control the axial movement of the lock 2.

Figure 5A:
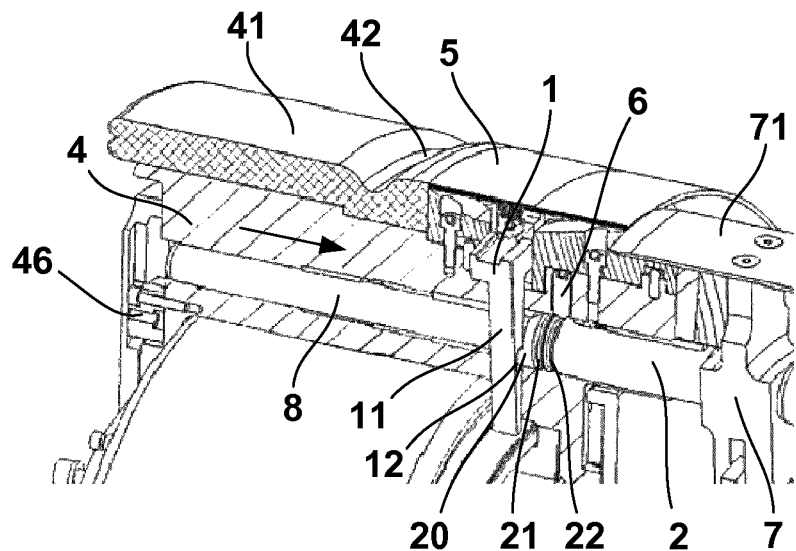
FIGS. 5a and 5b depict a special case for the implementation of the invention when the drum comprises a mechanism able to modify the axial distance between the grooves intended to receive the rings that reinforce the beads of the tire.

When the mobile elements are returned to a first extreme position corresponding to the maximum reduction in distance between the grooves 42, as illustrated in FIG. 5a, the axially internal part of the pusher comes into abutment against the corresponding face of the central support 7. Continuing to move the grooves 42 closer together forces the other axial end 20 of the lock 2 to enter the housing 12 in the rod 11 supporting the pusher 1. The lock 2 is then in the closed position and the sleeve 5 is kept level with the receiving surface whatever the diameter to which the latter is brought.

Figure 5B:
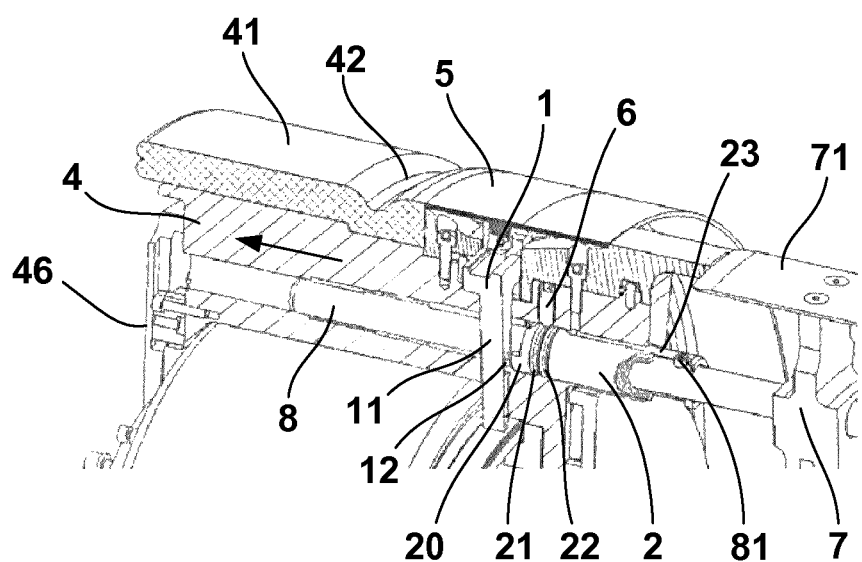

To disengage the end 12 of the lock from the housing 12 all that is required is for the reverse operation to be carried out and for the separation between the grooves 42 to be brought to its maximum extreme position as illustrated in FIG. 5b. A stud 81 positioned axially at a suitable point along the spindle 8 allows the lock 2 to move axially along the spindle 8 running in an axial cut 23 made on a generatrix of the lock as illustrated in FIG. 3b. When the mobile sector 4 reaches the end of its travel directed axially outwards, the stud 81 comes into abutment against the axially internal part of the cut 23 and blocks any further continuation of the axial movement of the lock 2 relative to the central part 7. Continuation of the movement of the mobile sector disengages the lock from the housing 12 and this allows the pusher 1 to move radially and the groove to form in line with the elements 43 and 44 under the effect of the elastic forces generated by the sleeve 5.

To avoid malfunctions it may prove advantageous to keep the lock 2 in the desired axial position relative to the rod 11 and to the mobile sector 4 while the said mobile sectors are moving axially or radially.

To do that, it is possible to provide a ball-ended pusher 6 mounted in the mobile sector 4 collaborating with grooves 21 and 22 or housings placed on the lock 2. When the lock is in the closed position, the ball positions itself in the groove 22 and keeps the lock in this position. Further, when the lock is in the open position, the ball becomes housed in the groove 21. When the ball is in position in one or other of the grooves, the low axial loadings experienced by the lock during the axial or radial movement of the mobile sectors do not alter the position of the lock. A small force, generated by the movements into each of the extreme axial positions of the mobile sectors allows the ball of the ball-ended pusher 6 to be switched from one groove to the other.

The example supporting the present description is by no means limiting, particularly regarding the respective positions of the lock and of the pushers with respect to the mobile sector and it goes without saying that similar mechanical effects can be obtained using mechanical elements that perform the same functions and are suited to tire-building drums of different construction.

The invention claimed is:

1. A variable-diameter tire-building drum adapted for the manufacture of a green tire, comprising:
   a generally cylindrical receiving surface formed of radially mobile sectors and bearing elements that constitute the receiving surface, the receiving surface comprising at least one circular groove containing an elastic circumferential sleeve which is held radially away from the bottom of the groove by pushers able to move radially with respect to the mobile sectors so as to align the radially external surface of the sleeve with the receiving surface when the drum is brought to a first laying diameter, and which is pressed against the bottom of the groove under the effect of circumferential elastic tensions when the drum is placed at a laying diameter greater than the said first laying diameter,
   wherein disengageable locks keep the pushers in a position that the radially external surface of the sleeve is aligned
   with the receiving surface, wherein the keep of the pushers in the position is independent of the diameter to which the said receiving surface is brought,
   further comprising a mechanism able to alter the axial position of the mobile sectors between two extreme positions,
   wherein the mobile sectors reaching end stops in each of the extreme axial positions causes the locks to open or close respectively.

2. The tire-building drum according to claim 1, further comprising two grooves arranged axially one on each side of the meridian of the drum.

3. The tire-building drum according to claim 1, wherein, in a position referred to as the closed position, the disengageable locks prevent the pushers from moving radially relative to the mobile sectors on which the said pushers are mounted.

4. The tire-building drum according to claim 1, wherein, in a position referred to as the open position, the disengageable locks allow the pushers to slide radially relative to the mobile sectors on which the said pushers are mounted.

5. The tire-building drum according to claim 1, wherein each pusher comprises a rod sliding radially with respect to the mobile sector on which the said pusher is mounted, so that when the drum is brought to its first laying diameter, a first end of the rod comes into abutment against a cylindrical surface of constant diameter and the other end pushes back the elastic sleeve so that the radially external surface of the said sleeve is at the same diameter as the laying diameter of the drum.

6. The tire-building drum according to claim 5, wherein the part of the pusher supporting the elastic sleeve comprises axial projections able to support the elastic sleeve.

7. The tire-building drum according to claim 6, wherein the axial projections have an axial length substantially equal to the width of the groove.

8. The tire-building drum according to claim 5, wherein the locks axially enter a housing formed on the rod of the pusher so as to hold the said pusher in the position that the radially external surface of the sleeve is aligned with the receiving surface.

9. The tire-building drum according to claim 5, wherein a ball-ended pusher, mounted in each of the mobile sectors, keeps the lock mounted on the said sector in an open or closed position so as to prevent the lock from moving axially relative to the rod of the pusher when the mobile sectors are moving radially or axially.

* * * * *